No. 840,478. PATENTED JAN. 8, 1907.
H. P. DAVIS & F. CONRAD.
PROTECTIVE APPARATUS FOR ELECTRICAL CIRCUITS.
APPLICATION FILED JAN. 20 1904.
2 SHEETS—SHEET 2.
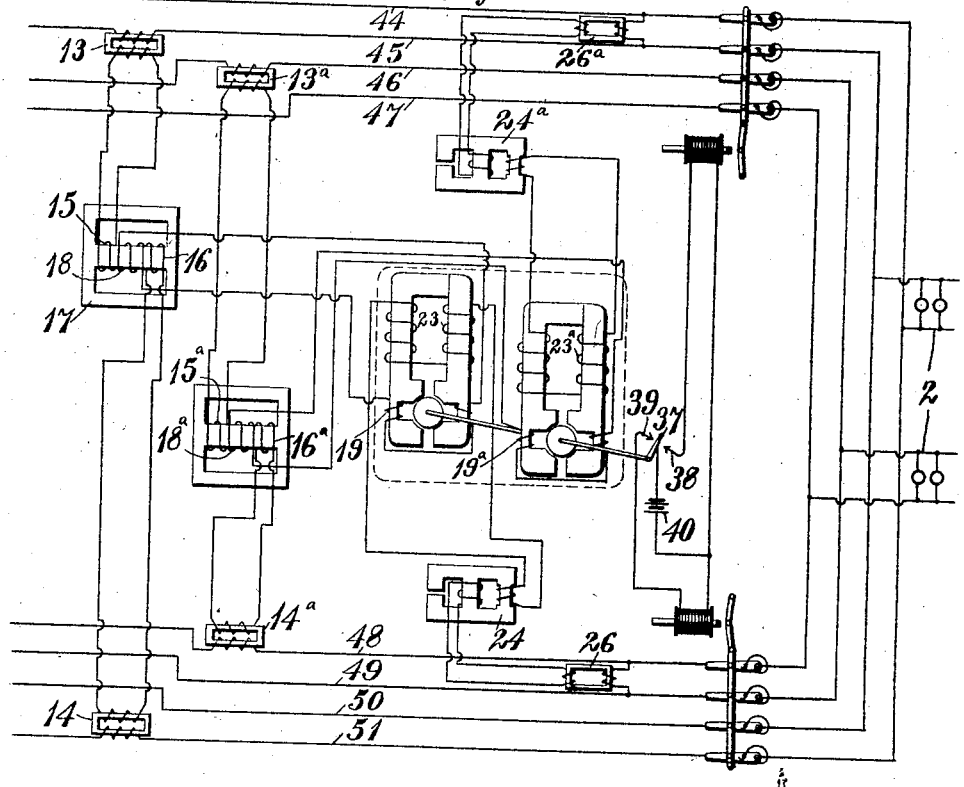
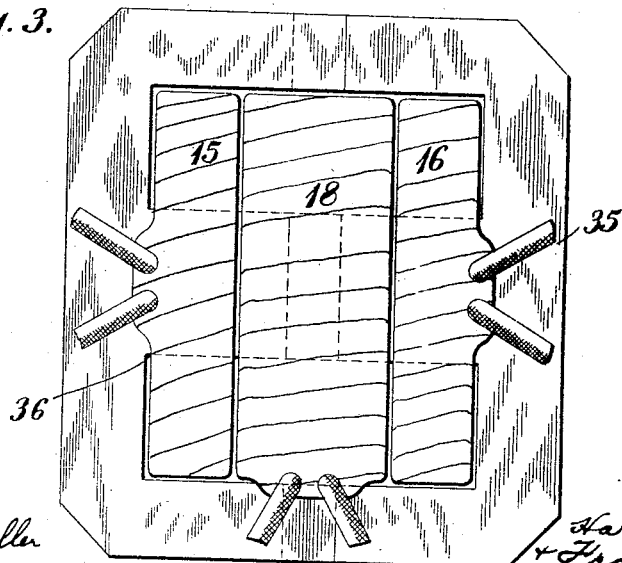
WITNESSES:
Fred H Miller
Otto S Schairer
INVENTORS
Harry P Davis
& Frank Conrad
BY
Wesley G Carr
ATTORNEY

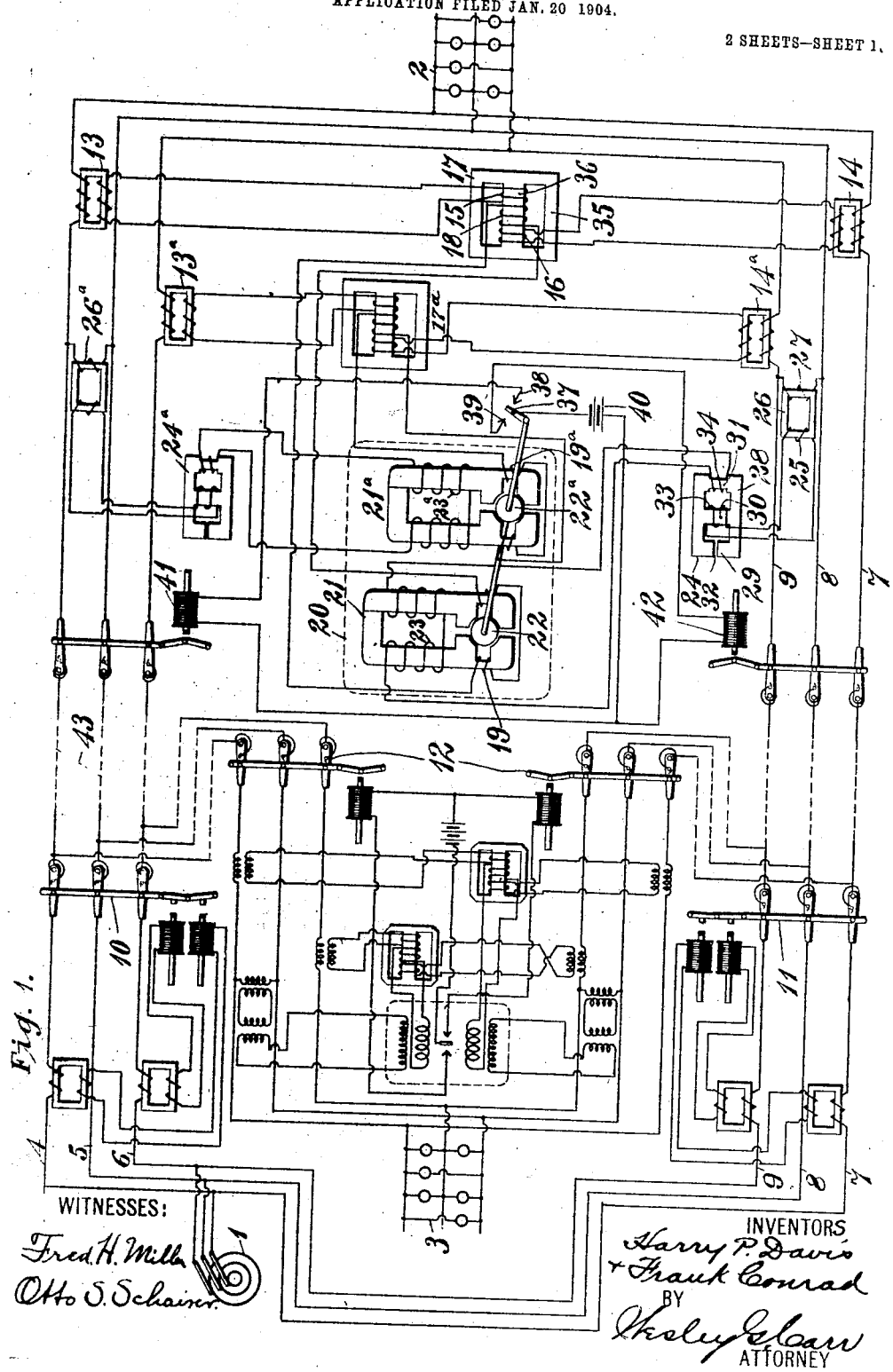

UNITED STATES PATENT OFFICE.

HARRY P. DAVIS, OF PITTSBURG, AND FRANK CONRAD, OF EDGEWOOD PARK, PENNSYLVANIA, ASSIGNORS TO WESTINGHOUSE ELECTRIC & MANUFACTURING COMPANY, A CORPORATION OF PENNSYLVANIA.

PROTECTIVE APPARATUS FOR ELECTRICAL CIRCUITS.

No. 840,478.   Specification of Letters Patent.   Patented Jan. 8, 1907.

Application filed January 20, 1904. Serial No. 189,903.

*To all whom it may concern:*

Be it known that we, HARRY P. DAVIS, a resident of Pittsburg, and FRANK CONRAD, a resident of Edgewood Park, in the county of Allegheny, State of Pennsylvania, citizens of the United States, have invented a new and useful Improvement in Protective Apparatus for Electrical Circuits, of which the following is a specification.

Our invention relates to apparatus for the protection of high-tension-transmission lines; and its object is to provide means for interrupting the circuit in a line when the current in any conductor of a line exceeds by not less than a predetermined amount the current in a corresponding conductor of another line.

In transmitting electrical energy at high potentials over long distances it is a usual practice to employ two or more parallel lines. This is done for the purpose of avoiding the interruption of service which would occur in the event of an accident to a system embodying only a single line. It therefore becomes advisable to employ protective devices the operation of which will affect the injured line only.

Our invention is applicable to systems comprising one or more generating-stations from which the energy is transmitted to distributing-points by means of parallel lines, at either or both ends of which we propose to place devices which are operated only when the current of a given phase in one set of conductors exceeds by not less than a predetermined amount the current in another corresponding set. One or both ends of the lines may be protected also by means of ordinary overload devices, if desired.

Our invention is illustrated in the accompanying drawings, in which—

Figure 1 is a diagrammatic view of a complete three-phase system with the connections of the devices properly made at one of the ends of the lines, and Fig. 2 is a similar diagram of the connections of the devices at one end of a two-phase system. Fig. 3 represents a form of transformer which is employed in connection with a circuit-breaker that is intended to operate when the currents in the parallel lines become unequal.

Referring now more particularly to Fig. 1, a three-phase generator 1 is shown as supplying energy to loads 2 and 3 through conductors 4, 5, and 6 and 7, 8, and 9, the line comprising conductors 4, 5, and 6 being respectively in parallel with that comprising conductors 7, 8, and 9. A load 3, comprising suitable translating devices, may be considered as supplied by a branch circuit which is connected to the main line at any desired point. At the generator end overload circuit-breakers are indicated at 10 and 11 and reverse-current breakers are indicated in the ends of the branch and main lines at 12. Series transformers 13 and 14, the primaries of which are respectively connected in the conductors 4 and 7 of the parallel lines, have their secondaries connected, respectively, in series with coils 15 and 16 of another transformer 17, a third coil 18 of which is energized only when the current in one of the coils 15 and 16 exceeds by a predetermined amount that in the other.

The coil 18 is connected to the current-winding 19 of a specially-constructed instrument 20, which comprises, substantially, two ordinary wattmeters 21 and 21ª, having their movable parts 22 and 22ª mechanically connected. The voltage-winding 23 of the wattmeter 21 is supplied with energy through an intermediate transformer 24 from secondary winding 25 of a transformer 26, the primary winding 27 of which is connected between the conductors 8 and 9.

The transformer 24 is so constructed that an operating voltage may be maintained across the terminals of the voltage-winding 23 of the wattmeter 21 regardless of the fluctuations of the voltage of the line. It comprises an iron core 28, having three legs 29, 30, and 31, in one of the outer ones, 29, of which is an air-gap 32, the other outer one, 31, being of reduced cross-section. The primary winding 33 is placed upon the middle leg 30 and the secondary winding 34 upon the outer leg 31, having the reduced cross-section. The iron core at ordinary voltages is oversaturated, the extra flux being forced across the air-gap 32. If the voltage in the line drops considerably, there is still sufficient flux in the outer leg 31 of reduced cross-section to maintain an approximately constant voltage at the terminals of the secondary winding 34.

The circuit connections of transformers 13ª, 14ª, 17ª, 24ª, and 26ª and wattmeter-windings 19ª and 23ª are substantially like those described for transformers 13, 14, 17, 24, and 26 and windings 19 and 23 and need not here be repeated.

The transformer 17, upon which the coils 15, 16, and 18 are wound, is also specially constructed in order that energy may be supplied to the winding 18 only when the currents in corresponding parallel conductors are unequal. The core 35 of this transformer comprises laminæ of substantially the same form as are used in transformers of the shell type, the three coils 15, 16, and 18 being placed upon the middle leg 36 with the winding 18 between windings 15 and 16. With this arrangement if the current in either of the coils 15 and 16 exceeds by a predetermined amount that in the other the resulting flux energizes the winding 18. A similar result occurs if the direction of the drop of potential through either of the windings 15 and 16 is reversed from its normal direction.

The instrument 20, which comprises wattmeters 21 and 21ª, is provided for the purpose of selecting the line upon which a short circuit or other accident may have occurred and for causing other suitable apparatus to operate to cut that line out of service. It being desirable to employ a circuit-closing device that shall be responsive only to differences between the currents in the two lines, we have utilized the well-known wattmeter principle to produce two magnetic fields that are of different phase in order to actuate the movable member mounted within their combined influence and have made the operation solely dependent upon differences in currents by supplying a substantially constant voltage to one of the windings and supplying no energy to the other winding except when the proper actuating conditions exist. If the current traversing the transformers 13 and 13ª exceeds by a predetermined amount that traversing the corresponding transformers 14 and 14ª, wattmeter-needle 37 is brought into engagement with the one or the other of contact-terminals 38 and 39 and a circuit is completed through battery 40 and the one or the other of circuit-breaker tripping-coils 41 and 42, according to the line on which the short circuit has occurred.

It is to be understood that any other suitable device may be employed which will satisfactorily indicate the injured line and cause it to be thrown out of service, the specific type of instrument here shown forming no part of our present invention.

The operation of the system may be understood by assuming, for example, a short circuit at 43 between conductors 4 and 5. The circuit-breakers at 10, being ordinary overload devices, will open because of the excessive current through them and the short circuit. As a result of the short circuit different amounts of current traverse the transformers 13 and 14 and the windings 18 and 19 are energized, thereby causing needle 37 to engage contact-terminal 38. A circuit is then completed through battery 40 and circuit-breaker tripping-coil 41, and the line comprising conductors 4, 5, and 6 is cut out of service. The apparatus operates similarly for a short circuit between any other conductors of either line.

By varying a few of the minor details of the connections of the devices our invention may be employed without departing from its scope on transmission systems having any number of phases.

The diagram shown in Fig. 2 gives the connections of the devices at a distant end of the parallel lines of a two-phase system. In this system the primary windings of the series transformers 13 and 13ª are, respectively, connected in the conductors 45 and 46 of one of the parallel distributing-lines, and the primary windings of the transformers 14 and 14ª are respectively connected in a similar manner in the conductors 51 and 48 of the other line, the secondary windings being respectively connected to the primary windings 15, 15ª, 16, and 16ª of the relay-transformers, the secondary windings 18 and 18ª of which are connected to the special instrument 20, as in the three-phase system. The connections of the special transformers 24 and 24ª to the voltage-windings 23 and 23ª of the instrument 20 are also similar to those shown for the three-phase system, energy being supplied thereto from the transformers 26 and 26ª, the primary windings of which are connected, respectively, between the conductors 44 and 45 and between conductors 48 and 49.

It is evident that we have provided such means for protecting parallel transmission-lines that an injured line or one on which a short circuit may have occurred may be automatically isolated or cut out without disturbing a parallel line, and we do not wish our invention to be limited except by such restrictions as are imposed by the prior art.

It is to be also understood that our invention is not limited to the employment of a single generating-station for the parallel lines, since the number and location of generating-stations may be varied in accordance with the lengths of the transmission-lines and other conditions of service.

We claim as our invention—

1. The combination, in an alternating-current system of electrical distribution having parallel distributing-lines and circuit-breakers in one or both of the ends thereof, of means for selecting and energizing the tripping-coil of the proper circuit-breaker comprising a relay-transformer having two primary windings which are respectively energized by currents proportional to the currents in the distributing-conductors and which normally induce in a magnetic circuit opposing fluxes in approximately equal amounts and a secondary winding which is energized by the resultant of the primary fluxes, current-windings in series with said secondary windings, voltage-windings receiving an approximately constant voltage, an auxiliary circuit for each of said circuit-breaker tripping-coils, and a switch actuated by said current and voltage windings for closing the one or the other auxiliary circuit.

2. The combination, in an alternating-current system of electrical distribution having parallel distributing-lines, with circuit-breakers in either or both ends thereof, and electromagnetic means for selecting and energizing the tripping-coil of the proper circuit-breaker, of means for energizing said selecting apparatus comprising a transformer having two-primary windings which normally produce opposing fluxes in approximately equal amounts and a secondary winding which is energized by the resultant of the primary fluxes.

3. The combination, in an alternating-current system of electrical distribution having parallel distributing-lines, with circuit-breakers in either or both ends thereof, and electromagnetic means for selecting and energizing the tripping-coil of the proper circuit-breaker having current and voltage windings, of means for energizing the voltage-windings of said selecting apparatus with an approximately constant voltage comprising a transformer having a magnetically-saturated iron core and a leakage-path for the flux.

4. A system of electrical distribution comprising a generating-station, parallel distributing-lines, circuit-breakers near the distributing ends of the lines having tripping-coils, an auxiliary circuit therefor, series transformers having primary windings in series with conductors of the distributing-lines, a relay-transformer having primary windings connected to the secondary windings of said series transformers and normally producing opposing fluxes in approximately equal amounts and a secondary winding which is energized by the resultant of the primary fluxes.

5. The combination, in an alternating-current system of electrical distribution having parallel distributing-lines, with circuit-breakers in one or both ends thereof and means for selecting and energizing the tripping-coil of the proper circuit-breaker, of means for energizing current-windings of said selecting apparatus comprising relay-transformers each having two primary windings receiving energy respectively proportional to that flowing in corresponding conductors of parallel lines and secondary windings which are energized only when the current in one of said primary windings exceeds by more than a predetermined amount that in the other of the same transformer and which are in series with said current-windings.

In testimony whereof we have hereunto subscribed our names this 12th day of January, 1904.

HARRY P. DAVIS.
FRANK CONRAD.

Witnesses:
CAROLINE SMYERS,
BIRNEY HINES.